US006944975B2

(12) United States Patent
Safdeye et al.

(10) Patent No.: US 6,944,975 B2
(45) Date of Patent: Sep. 20, 2005

(54) SHOE HAVING A FABRIC OUTSOLE AND MANUFACTURING PROCESS THEREOF

(75) Inventors: Michael Safdeye, Brooklyn, NY (US); Chun-Ruey Wu, Taipei (TW); Michael Stein, Yardley, PA (US)

(73) Assignee: E.S. Originals, Inc., New York, NY (US)

( * ) Notice: Subject to any disclaimer, the term of this patent is extended or adjusted under 35 U.S.C. 154(b) by 163 days.

(21) Appl. No.: 09/804,066

(22) Filed: Mar. 12, 2001

(65) Prior Publication Data

US 2002/0166261 A1 Nov. 14, 2002

(51) Int. Cl.[7] ......................... A43B 13/02; A43B 13/04; A43B 13/12; A43B 13/22

(52) U.S. Cl. ....................... 36/59 R; 36/59 C; 36/25 R; 36/9 R

(58) Field of Search .............................. 36/59 R, 30 R, 36/59 C, 25 R, 31, 103, 9 R, 9 A, 71; 264/257, 266, 271.1, 279.1, 255, 324

(56) References Cited

U.S. PATENT DOCUMENTS 384,483 A * 6/1888 Walters ...................... 36/59 R
1,399,766 A * 12/1921 Grosjean .................... 36/30 R
1,587,377 A * 6/1926 Grosjean .................... 36/30 R
1,716,790 A * 6/1929 Mitchell ..................... 36/59 R
2,121,678 A 6/1938 Armor
2,371,689 A 3/1945 Greg et al.
2,391,564 A 12/1945 Gregg
2,400,487 A 5/1946 Clark
2,499,751 A 3/1950 Hoza
2,603,891 A 7/1952 Cohn
2,638,633 A 5/1953 Root
2,878,523 A 3/1959 Hardy
2,956,313 A 10/1960 Choice
3,016,631 A 1/1962 Servin
3,063,074 A * 11/1962 Scholl ......................... 36/9 R
3,085,294 A 4/1963 Rosenbaum (Continued)

FOREIGN PATENT DOCUMENTS

CN 2244835 Y 1/1997
CN 2405451 Y 11/2000
CN ZL 00267877.2 10/2001
DE 4015138 A1 * 11/1991 ........... A43B/03/14
FR 2617382 A1 * 1/1989 ........... A43C/15/02

OTHER PUBLICATIONS

Agent's confirmation (with unverified translation) for Purchase Order 65113 to be delivered Mar. 26, 1999 for "Chenille Slipper, White TPR with Canvas Wrap Sole".
Color pictures of chenille slipper allegedly corresponding to Purchase Order 65113, slippers including a hang tag, and an image of the alleged hang tag including handwritten and unverified translations into English.
Weisner Purchase Orders 11051 and 11052 for ladies clogs with open knit collar, style number 9122Navy and 9122Burg, respectively (Mar. 29, 1999).
Agent's confirmations showing Purchase Order Numbers 11051 and 11052 and the delivery date of Jul. 15, 1999 in English (2 pages).
New York Ruling D89353 on behalf of Weisner Products, Inc. (Apr. 21, 1999; 2 pages).
New York Ruling E86018 on behalf of Weisner Products, Inc. (Sep. 13, 1999; 2 pages).
Copy of Complaint No.: 4:03CV00774TCM.
Copy of Dority & Manning letter dated Jun. 3, 2003.

*Primary Examiner*—Anthony D. Stashick
(74) *Attorney, Agent, or Firm*—Kirschstein, et al

(57) ABSTRACT

Improvements in shoe constructions are provided that provide ground contacting surfaces of multiple materials that resist separation from one another and which provide traction and tariff benefits.

26 Claims, 6 Drawing Sheets

U.S. PATENT DOCUMENTS

| | | | | | |
|---|---|---|---|---|---|
| 3,352,032 | A | * | 11/1967 | Yamaguchi | 36/9 R |
| 3,642,563 | A | * | 2/1972 | Davis et al. | 36/45 |
| 3,672,077 | A | * | 6/1972 | Coles | 36/59 B |
| 3,676,542 | A | | 7/1972 | Maltby | |
| 3,765,978 | A | | 10/1973 | Matt | |
| 3,863,272 | A | | 2/1975 | Guille | |
| 3,888,026 | A | * | 6/1975 | Dassler | 36/25 R |
| 3,972,973 | A | | 8/1976 | Yardley et al. | |
| 4,076,891 | A | | 2/1978 | Yardley et al. | |
| 4,120,477 | A | | 10/1978 | Justamante | |
| 4,122,574 | A | | 10/1978 | Karalis | |
| 4,356,643 | A | | 11/1982 | Kester et al. | |
| 4,519,148 | A | * | 5/1985 | Sisco | 36/103 |
| 4,858,337 | A | * | 8/1989 | Barma | 36/30 R |
| 5,012,541 | A | * | 5/1991 | Ganon | 36/9 R |
| 5,012,596 | A | * | 5/1991 | Schiller | 36/25 R |
| 5,053,179 | A | | 10/1991 | Masui et al. | |
| 5,106,445 | A | | 4/1992 | Fukuoka | |
| 5,396,675 | A | | 3/1995 | Vincent et al. | |
| 5,553,399 | A | | 9/1996 | Strong | |
| 5,725,823 | A | | 3/1998 | Finn et al. | |
| 5,743,027 | A | * | 4/1998 | Barma | 36/4 |
| D414,920 | S | | 10/1999 | Cahill | D2/953 |
| D415,610 | S | | 10/1999 | Cahill | D2/960 |
| D415,876 | S | | 11/1999 | Cahill | D2/954 |
| 6,035,554 | A | * | 3/2000 | Duncan | 36/11.5 |
| D423,199 | S | | 4/2000 | Cahill | D2/953 |
| 6,149,852 | A | | 11/2000 | Romanato et al. | |
| 6,312,782 | B1 | * | 11/2001 | Goldberg et al. | 36/103 |
| 6,321,464 | B1 | * | 11/2001 | Oberg et al. | 36/25 R |
| 6,430,844 | B1 | | 8/2002 | Otis | |
| 6,558,784 | B1 | * | 5/2003 | Norton et al. | 36/45 |

* cited by examiner

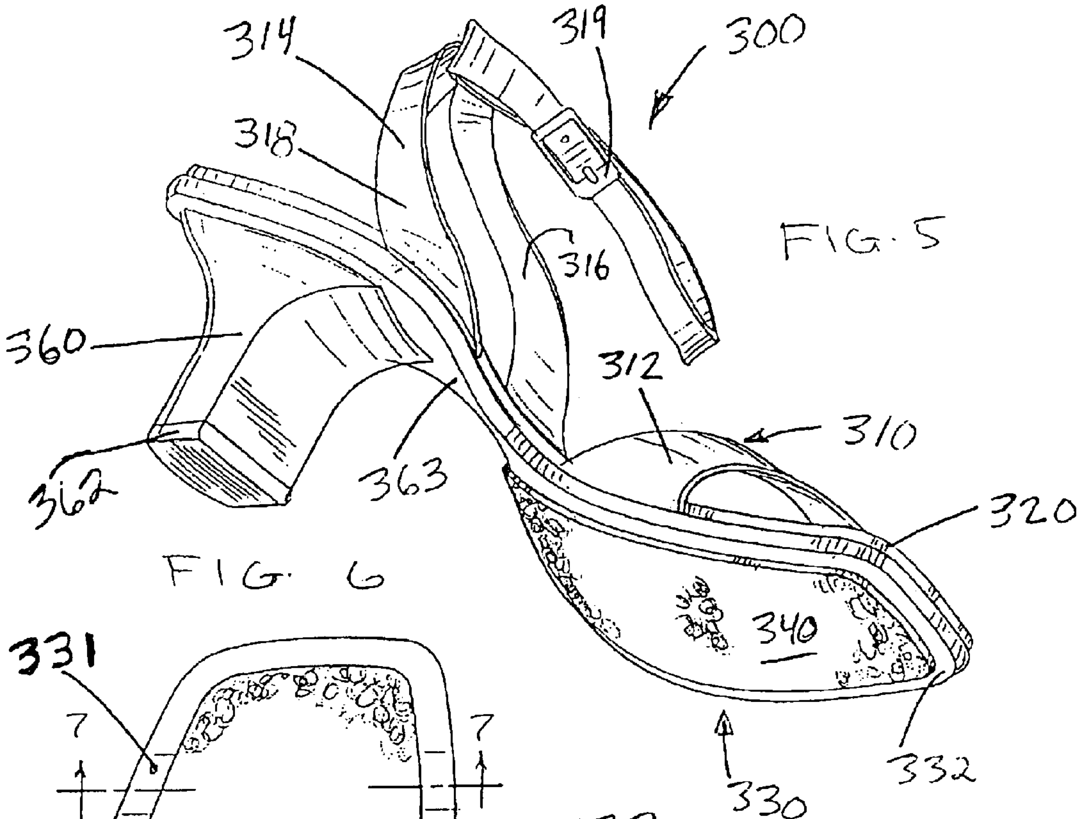
FIG. 5
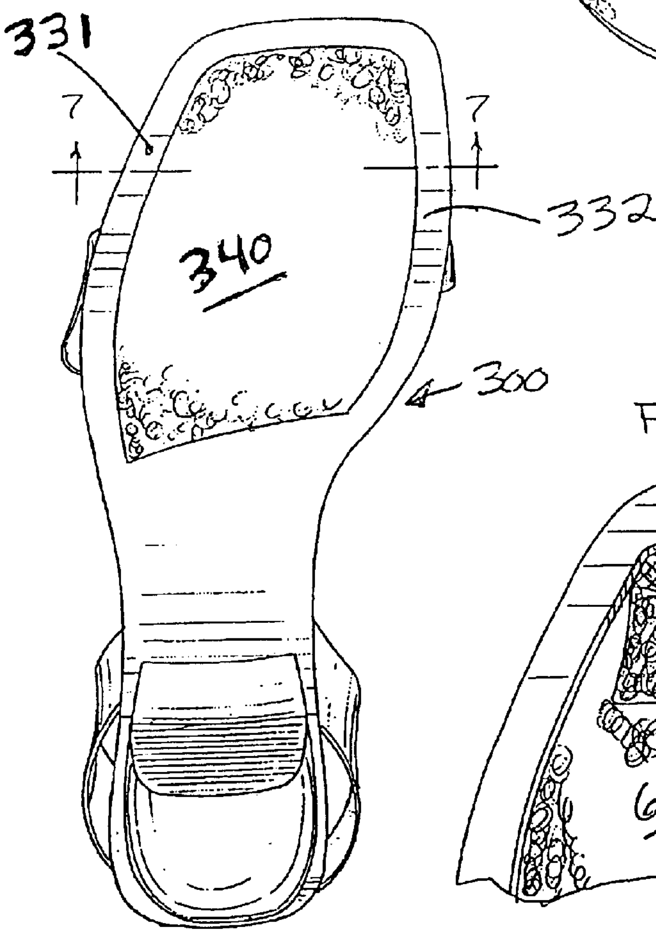
FIG. 6
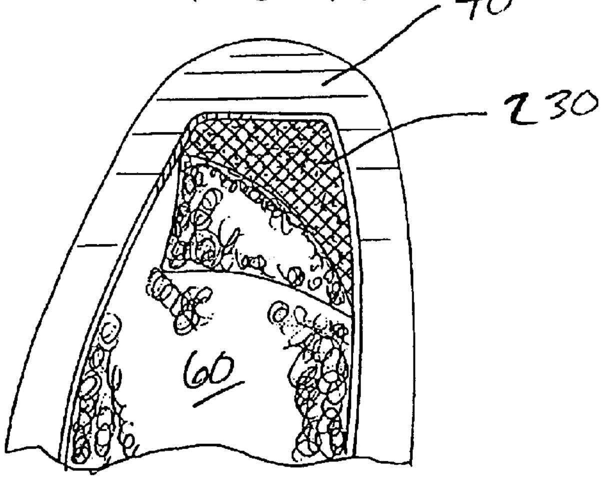
FIG. A

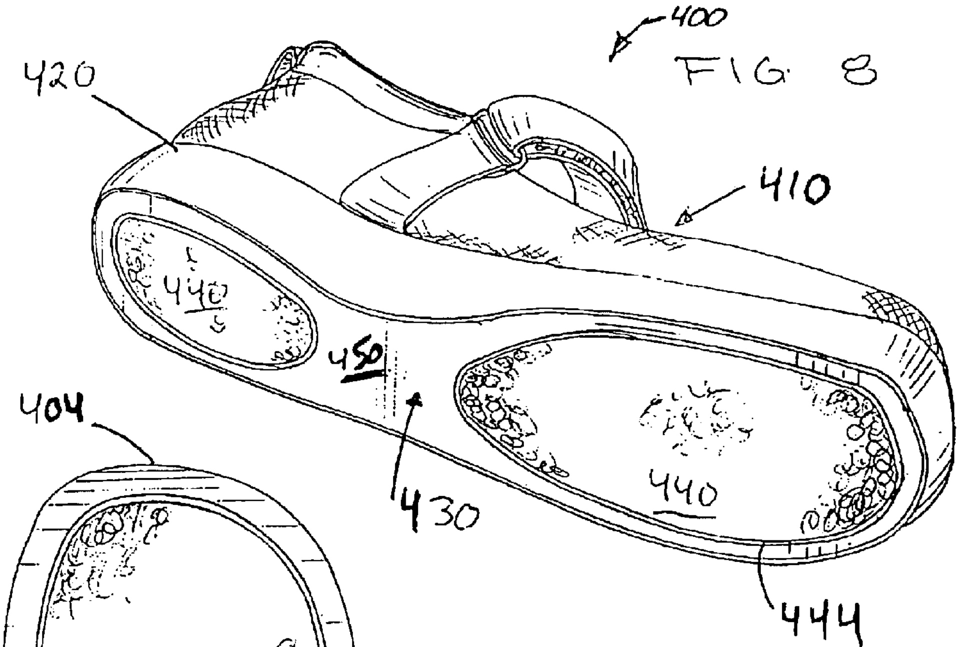
FIG. 8
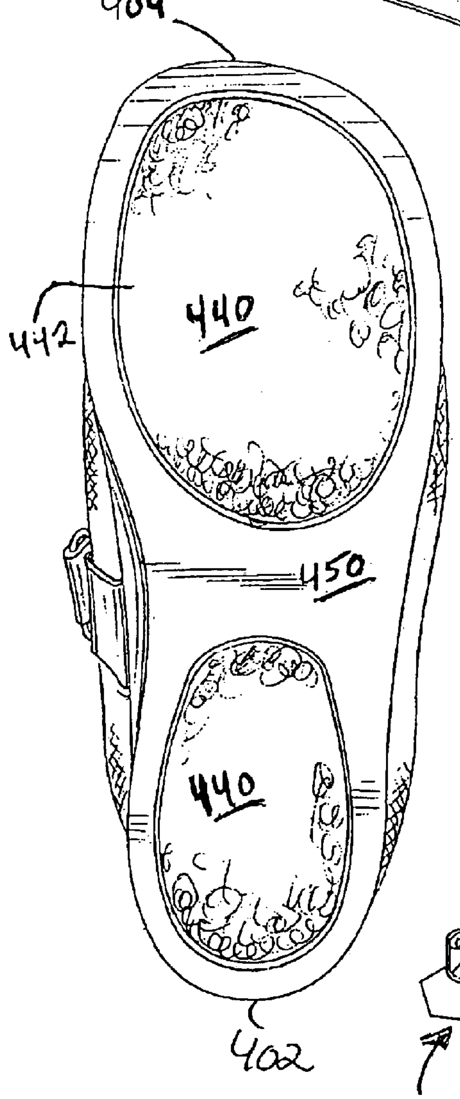
FIG. 9
FIG. 7
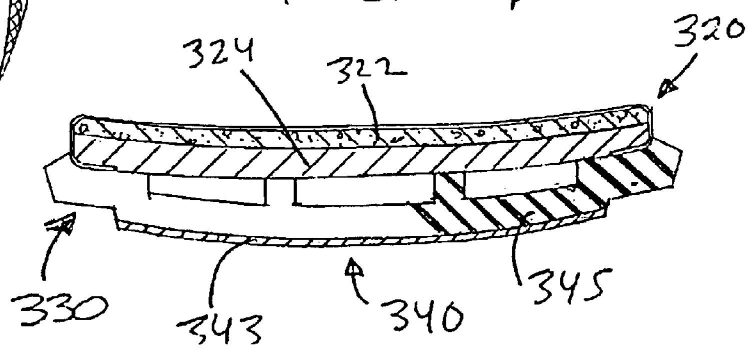

SHOE HAVING A FABRIC OUTSOLE AND MANUFACTURING PROCESS THEREOF

TECHNICAL FIELD

The present invention relates generally to a shoe and more specifically, relates to a shoe having a fabric material disposed on at least a portion of the outsole and to a manufacturing process thereof.

BACKGROUND OF THE INVENTION

A shoe is generally formed of an upper, a lower attached to the upper, and an outsole attached to the lower. The outsole of the shoe is the exposed portion of the sole that contacts the ground or other supporting surface. The outsole provides many characteristics of the shoe such as the shoe's traction and stability with respect to the intended supporting surface. For example, the outsole of the shoe may be provided with some type of traction elements arranged in a pattern to provide a gripping action between the outsole and the ground or supporting surface. The outsole should also be manufactured so that it offers extended wear to permit the shoe to be worn for a lengthy period of time.

Often, the outsole of the shoe is formed of a rubber material or leather in designer shoes and the like. In men's and women's shoes, the outsole is very often substantially smooth and this can cause traction problems. For example, such outsoles are often very slippery because of their smooth texture and this increases the chances that the user may accidently slip or slide during normal use. The risk of slipping and sliding is increased significantly when the surface or supporting surface is wet or otherwise in a slippery state.

The outsole is an important component of the shoe for an additionally entirely unrelated reason which has gone unrecognized in the art of shoe sole construction. As the economies of most countries become more and more internationalized, international commercial transactions invoke national customs tariffs that generally must be paid when goods are shipped. Under the Harmonized Tariff Schedules of each country, goods are classified under various categories. For example, most footwear is classified under Chapter 64 of the United States Harmonized Tariff Schedules which covers the importation of goods into the United States. Within this chapter, the following major headings are recited for footwear:

| | |
|---|---|
| 6401 | Waterproof Rubber or Plastic Footwear; |
| 6402 | Other Footwear with Uppers and Outersoles of Rubber or Plastic; |
| 6403 | Footwear with Uppers of Leather and Outersoles Of Rubber, Plastic, Leather, or Composition Leather; |
| 6404 | Footwear with Uppers of Textiles and Outersoles of Rubber, Plastic, Leather, or Composition Leather; and |
| 6405 | Other Footwear. |

Accordingly, footwear is generally classified in a given heading based upon the material of the upper and the material of the outersole. Consequently, the outsole plays an important role in determining the rate of duty which is to be applied to the specific footwear article. Depending upon the material which is used to manufacture the upper and the sole, the rate of the duty may vary significantly. For example, the rate of duty may range from 37.5% ad valorem for many common types of footwear to 3% ad valorem for certain types of sandals and similar footwear. In determining the applicability of a particular section of one chapter of the United States Harmonized Tariff Schedules, knowledge of specific details of the material is necessary. For example, a classification may be based on the type of material that is present on 50% or more of the bottom surface of the shoe (outersole) that contacts the ground.

Over many years, manufacturers have focused their attention on improving the traction properties of shoe outsole construction, but have not recognized that a price advantage can be had by combining materials in the outer shoe sole construction.

What is needed in the art and has heretofore not been available is an outsole and method of manufacture thereof which offers slip resistance and other desirable properties in addition to providing a competitive advantage to the manufacturer based on its construction.

SUMMARY OF THE INVENTION

According to the present invention, a shoe including an upper, a lower attached to the upper, and an outsole attached to the lower is presented. In one embodiment, the outsole has a ground contacting surface which includes a first section and a second section, with the first section being formed of a first material and the second section having an outer later formed of a fabric material. The first section is free of any fabric material and is instead formed of other suitable materials, such as rubber, leather, etc.

In another embodiment, the ground contacting surface substantially consists of a shaped fabric member having the fabric material disposed on an outer surface thereof. The shaped fabric member extends below other surrounding sections of the outsole which do not contain a fabric material, so as to form a ground contacting surface of the outsole.

According to the present invention, the outsole is preferably formed using a molding process and, more specifically, is formed using a two stage molding process. The fabric material is not just layered over an existing outsole construction but rather forms an integral part of the outsole construction itself. In one embodiment, a shaped fabric member having the fabric material disposed on an outer surface thereof is formed during a first molding process and then the shaped fabric member is disposed in a second mold. A second molding process is conducted and the remaining portion of the outsole is formed around the shaped fabric member which becomes an integral part of the outsole. The result is that an integral outsole is produced in which a substantial amount of the ground contacting surface of the outsole is defined by the fabric material. Preferably, greater than 50% of the ground contacting surface of the outsole includes the fabric material.

In accordance with the present invention, the outsole provides increased slip resistance, is durable, and provides a competitive manufacturing advantage.

Other features and advantages of the present invention will be apparent from the following detailed description when read in conjunction with the accompanying drawings.

BRIEF DESCRIPTION OF THE DRAWINGS

The foregoing and other features of the present invention will be more readily apparent from the following detailed description and drawings of illustrative embodiments of the invention in which:

FIG. 4 is a bottom plan view of the shoe of FIG. 1 showing a fabric portion of the outsole peeled back to expose a backing portion of the outsole;

FIG. 5 is a bottom perspective view of another exemplary type of shoe having an outsole in accordance with the present invention;

FIG. 6 is a bottom plan view of shoe of FIG. 1;

FIG. 7 is a cross-sectional view taken along the line 7—7 of FIG. 6;

FIG. 8 is a bottom perspective view of another exemplary type of shoe having an outsole in accordance with the present invention;

FIG. 9 is a bottom plan view of the shoe of FIG. 8;

DETAILED DESCRIPTION OF THE PREFERRED EMBODIMENTS

Figure 1:
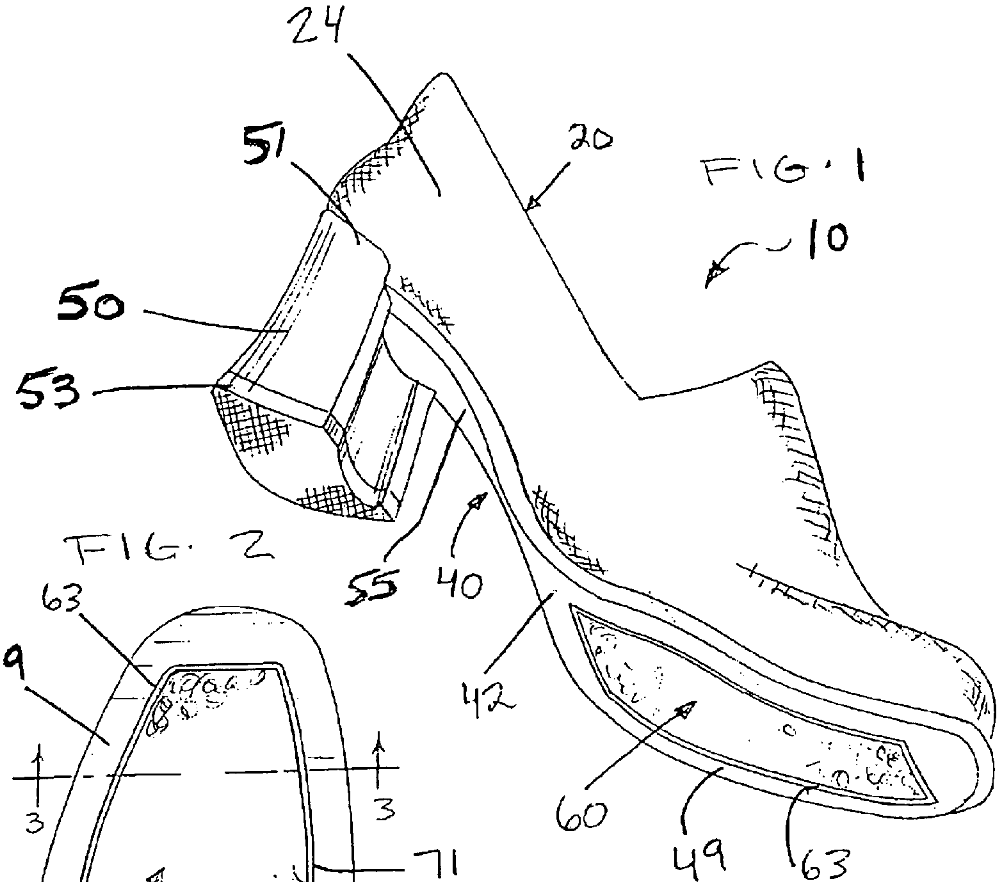
FIG. 1 is a bottom perspective view of one exemplary type of shoe having an outsole in accordance with one embodiment of the present invention.

The present invention will be first described with reference to FIGS. 1 through 4. FIG. 1 illustrates one exemplary type of shoe 10 having an upper 20, a lower 30 attached to the upper 20, and an outsole 40 attached to the lower 30. The shoe 10 is of a style which is commonly worn by women in both workplace settings and social settings. The style and nature of shoe 10 is merely exemplary and it will be understood that the present invention applies to a wide range of types of shoes, including but not limited to men's, women's, and children's shoes.

Figure 3:
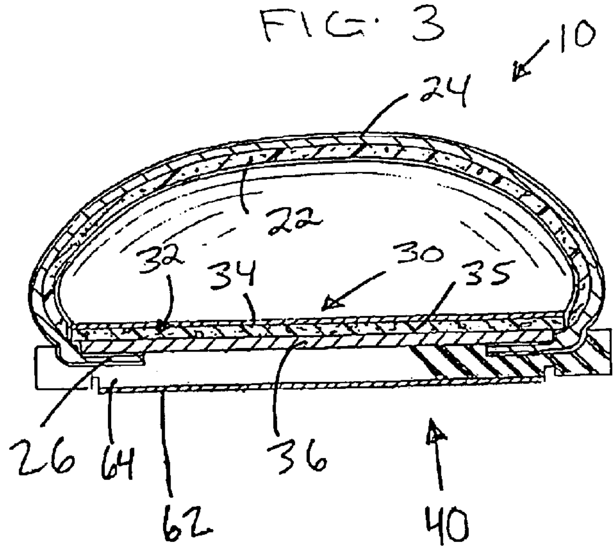
FIG. 3 is a cross-sectional view taken along the line 3—3 of FIG. 1.

FIG. 3 is a cross-sectional view of the shoe 10 showing its construction in greater detail. The upper 20 includes a soft cushioned material, such as a fabric-backed foam 22 at an interior portion of the shoe 10 for resiliently engaging a wearer's foot. The fabric-backed foam 22 thus serves to cushion the wearer's foot during use and reduce impact between the foot and the surrounding environment. The upper 20 also includes an exterior cover 24, such as a high pile fabric, coupled to the fabric-backed foam 22. For example, the exterior cover 24 may be stitched to the fabric-backed foam 22. It will be appreciated that the upper 20 may be formed of a number of different materials and foam and high pile fabric are merely exemplary materials. For example, the exterior cover 24 may be formed of leather or the like or velvet or the like, especially for women's shoes.

The lower 30 includes a base material 32 at the interior of the shoe 10 for engaging the wearer's foot. Typically, the base material 32 is formed of a foam or a fabric and may be formed of multiple layers. For example, the base material 32 of the exemplary shoe 10 actually includes a thin top layer 34 which may be formed of any number of materials, including a fabric and a suitable plastic material. Underneath the top layer 34 is a cushion element 35 which preferably has an identical shape as the top layer 34. The cushion element 35 is preferably formed of a soft cushioned material, such as a foam. It will be appreciated that the top layer 34 and cushion element 35 may be formed as a single integral piece.

Underneath the cushion element 35, a support layer 36 is provided.

The support layer 36 is also preferably similarly or identically shaped as the top layer 34 and the cushion element 35 and is designed to act as a backbone of the lower 30. The support layer 36 is formed of a rigid material so that it maintains its shape under application of force, such as the weight of the wearer. The support layer 36 may be formed of any number of rigid materials, such as a rigid plastic, a rigid reinforced cardboard member, etc. The cushion element 35 is coupled to the support layer 36 using any number of techniques, including applying an adhesive to a backside of the cushion element 35 and then applying the cushion element 35 to a topside of the support layer 36.

The upper and lower 20, 30 of the shoe are attached to one another using any number of techniques. For example and as shown in the cross-sectional view of FIG. 3, a portion of the upper 20, and more specifically a portion 26 of the exterior cover 24, is tucked underneath an edge of the lower 30 to secure the upper 20. The exterior cover 24 may be secured to the lower 30 by applying an adhesive or the like to the area where the exterior cover 24 and the lower 30 meet.

Figure 2:
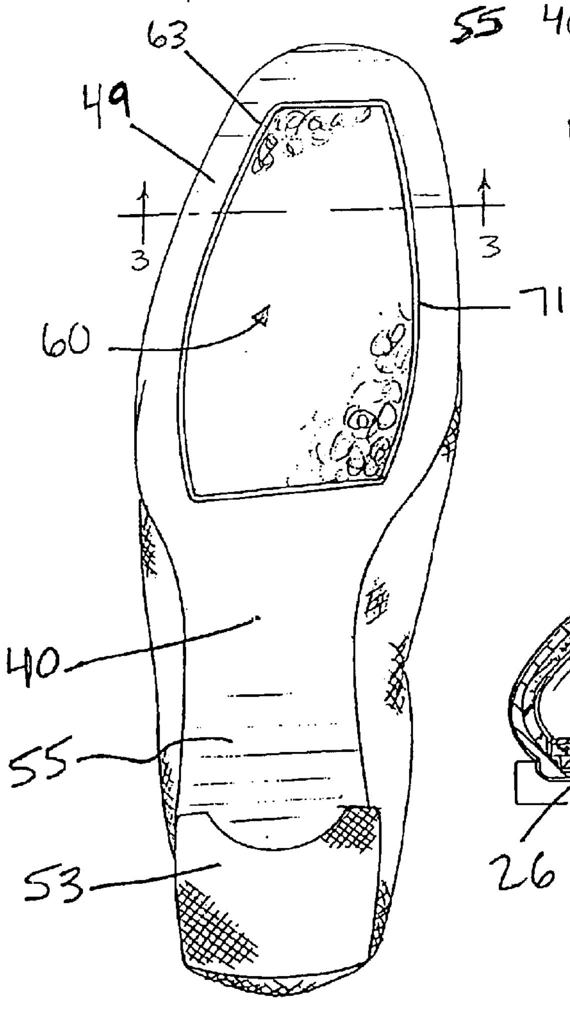
FIG. 2 is a bottom plan view of the shoe of FIG. 1.

In accordance with the present invention, the outsole 40 is made of a rigid material so as to provide support to the outsole 40 and includes an outer surface 42. The outsole 40 may have any number of shapes depending upon the type of shoe 10. For example, shoe 10 is a typical women's shoe and therefore includes a prominent heel 50. When shoe 10 has a heel, such as heel 50, the heel 50 may be formed as a separate member from the outsole 40 or the heel 50 may be integrally formed as part of the outsole 40. In the exemplary shoe 10, the heel 50 is a separate member which is coupled to the outsole 40 using known techniques. Preferably, an upper portion of the heel 50, in the form of a lip 51, extends around a heel portion of the exterior cover 24. This lip portion 51 is coupled to the adjacent heel portion of the exterior cover 24 using an adhesive or the like. A bottommost portion 53 of the heel 50 engages the ground or support surface and therefore may be formed of a suitable material for such wear. For example, the bottommost portion 53 may be formed of the same material as the other portions of the heel 50 or may be formed of a different material. The major portion of the heel 50 is preferably formed of a rigid material, such as a rigid plastic or wood. The bottommost portion 53 may be formed of this type of material or may be in the form of a shaped rubber pad which is coupled to the other portions of the heel 50, as shown in FIGS. 1–2.

As is known in the art, different portions of the outsole 40 of shoe 10 are referred to differently. The outsole 40 of shoe 10 includes the heel 50 formed at one end and includes a ball portion 49 formed generally at an opposite end of the shoe 10. The ball portion 49 is the portion of the outsole 40 which primarily contacts the ground during normal use of the shoe 10. Between the ball portion 49 and the heel 50, the outsole 40 includes a shank 55 which does not contact the ground during wear of the shoe 10. The shank 55 is thus angled upwardly away from the ground surface when the ball portion 49 and the heel 50 are seated against the ground. The height of the heel 50 determines the angle between the shank 55 and the ground surface.

In accordance with the present invention, the outsole 40 also includes a shaped fabric member 60 which forms a part of the outsole 40 and has a predetermined shape. As best shown in FIG. 3, the shaped fabric member 60 includes a thin, flexible, fabric sheet material 62 and a backing layer 64. Preferably, the fabric sheet material 62 is formed of a non-woven fabric, such as polyester fibers mixed with cotton. Thus, the fabric sheet material 62 is not produced using a weaving process but rather is produced using other suitable techniques for forming a non-woven fabric. For example, the polyester fibers may used to form a needle felt which is then impregnated with a material before being dried and pressed. It will be appreciated that the shaped fabric member 60 may have any number of shapes and sizes depending upon the shoe design and other parameters such as the amount of contact between the outsole 40 and the ground or support surface.

In accordance with the present invention, the shaped fabric member 60 is disposed on a significant and preferably substantial portion of the outsole 40 which engages the ground or support surface during normal use. More specifically, the shaped fabric member 60 preferably occupies an area which is at least greater than 50% of the area of the outsole 40 which contacts the ground. In the exemplary shoe 10 shown in FIGS. 1–3, the ground contacting portion of the outsole 40 includes the bottommost portion 53 of the heel 50 and the ball portion 49. It will be appreciated that the percent of the ground contacting surface of the shoe 10 that includes the shaped fabric member 60 will depend upon a number of factors, including but not limited to the type of shoe 10 (i.e., high heel or not) and the area of ground contacting surface as a percentage of the total area of the outsole 10. For example, the shaped fabric member 60 preferably occupies greater than 50% to about 90% of the entire ground contacting surface of the outsole 40.

In the shoe 10, the shaped fabric member 60 is disposed within the outsole 40 and more preferably is disposed within the ball portion 49 of the outsole 40. Preferably, the shaped fabric member 60 is integrally formed as part of the outsole 40 as will be described hereinafter. The bottommost portion 53 of the heel 50 is formed of a rubber or other suitable material. A gap 63 is formed between the fabric sheet material 62 and a surrounding edge 71 of the outer surface 42 of the outsole 40. As shown in the figures, the outer surface 42 of the outsole 40 surrounds the shaped fabric member 60. When the shaped fabric member 60 is disposed within the outsole 40, an outer face of the fabric sheet material 62 is preferably substantially planar to the surrounding outer surface 42 of the outsole 40 so that during use, the outsole 40 engages the ground in a relatively uniform manner.

The backing layer 64 is preferably formed of a shape-retaining material, for example, a rubber or plastic material. The backing layer 64 and the fabric sheet material 62 are integrally connected to one another by any number of techniques, including using a molding process as will be described in greater detail hereinafter. In addition, the surrounding outsole 40 and the backing layer 64 may be formed of the same material or may be formed of different materials. In one exemplary embodiment, both are formed of a thermoplastic. In another embodiment, both are formed of a material that is referred to herein as a thermoplastic rubber.

The shaped fabric member 60 along with the surrounding outsole 40 provide the shoe 10 with a slip-resistance, shape-retaining partially fabric outsole 40. It is also contemplated that the outer surface 42 and/or the backing layer 64 may have a tread pattern formed thereon for a decorative purpose, a functional purpose, or both. For example, the surface 42 and the layer 64 can have a tread pattern, and in the case of the backing layer 64, the fabric sheet material 62 can closely conform to the pattern, e.g., follow the contour thereof.

The use of the shaped fabric member 60 also has another associated advantage: the provision of the fabric sheet material 62 on greater than 50% of the ground contacting surface area of the outsole 40 enables the shoe 10 to be classified under a different section of the United States Harmonized Tariff Schedules and therefore permits the manufacturer of the shoe 10 to pay a different, lower rate of tariff duty. In other words, the classification of the shoe 10 for tariff purposes depends, in part, on the constituent material of the upper 20 and the constituent material of the outsole 40 (based upon the greatest surface area in contact with the ground). In the exemplary shoe 10, the upper 20 is formed of a textile material and the constituent material of the outsole 40 is also a textile material because the material which occupies the greatest surface area in contact with the ground is the fabric sheet material 62 (a material classified as a textile).

By having both the upper 20 and the outsole 40 formed of a textile material, the shoe 10 can be classified under "Other Footwear, with uppers of textile materials, Other" which has a lower rate of duty than footwear having a textile upper and an outersole formed of rubber, plastic, leather, or composition leather. Under the current United States Harmonized Tariff Schedules, the shoe 10 of the present invention is classifiable under subheading 6405.20.90, which carries a 12.5% rate of duty so long as greater than 50% of the ground contacting surface area of the outsole 40 is occupied by the fabric sheet material 62. This is significantly lower than a 37.5% rate of duty applied to many types of footwear with outersoles of rubber, plastics, leather or composition leather and uppers of textile materials. Thus, associated costs for the overall manufacturing and delivering process can be significantly reduced by decreasing the rate of duty which is applied to the footwear (shoe 10). This results in a competitive advantage.

The manufacture of shoe 10 and more specifically, the outsole 40 will now be described in greater detail with reference to FIGS. 1–3 and 10–12. A two step molding process is preferably used to manufacture the outsole 40. In a first molding process, the shaped fabric member 60 is formed. Initially, a piece of the fabric sheet material 62 is cut to a predetermined shape and size.

Preferably, the fabric sheet material 62 is a non-woven fabric, such as polyester fibers with cotton. This cut piece of the fabric sheet material 62 is then inserted into a first mold 100. The first mold 100 is a conventional mold having a first shaped die 102 and a second shaped die 104. The first and second dies 102, 104 have one or more cavities formed therein which define the shape of the shaped fabric member 60 and are generally shaped so as to be accommodated in the ball portion 49 of the outsole 40. The cut piece of fabric sheet material 62 is held in place again the first shaped die 102.

The first and second dies 102, 104 are heated to a predetermined temperature which permits the molding process to proceed without damaging or destroying the fabric sheet material 62. The predetermined temperature which is required for the molding process will depend upon a number of factors, including the type of thermoplastic resin used in the molding process. In one exemplary embodiment, the first and second dies 102, 104 are heated to a temperature of about 120° C. when a thermoplastic rubber is used to form the backing layer 64. The first and second dies 102, 104 are pressed together with the fabric sheet material 62 being held in place against the first die 102 and then the thermoplastic rubber is injected into the first mold 100 after the thermoplastic rubber has been melted to a softened state by being exposed to a sufficient temperature (120° C.).

Because the thermoplastic rubber is in a softened state, it is able to flow throughout a cavity formed by the first and second dies 102, 104. The thermoplastic rubber forms the shape of the backing layer 64 once the thermoplastic rubber cools after a predetermined time period in which the temperature of the first mold 100 is reduced. The result is that the shaped fabric member 60 is formed and the thermoplastic rubber and the fabric sheet material 62 are bonded to one another by the heating process of the molding operation. Once the shaped fabric member 60 has sufficiently cooled down, the first and second dies 102, 104 are opened and the shaped fabric member 60 is removed therefrom. Excess fabric sheet material 62 is cut off from the shaped fabric member 60 to provide for the shaped fabric member 60 shown in FIG. 11. As previously discussed, the shaped fabric member 60 includes the fabric sheet material 62 bonded to the backing layer 64.

Figure 11:
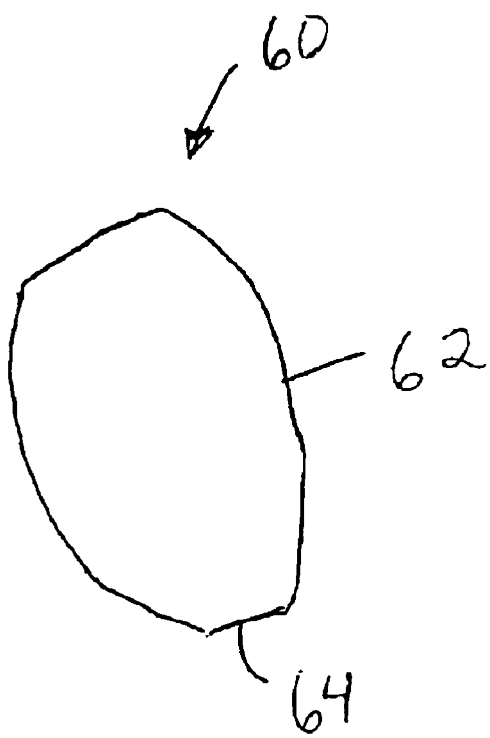
FIG. 11 is perspective view of a shaped fabric member formed during a process using the first mold of FIG. 10 and for use in an outsole in accordance with the present invention.
Figure 12:
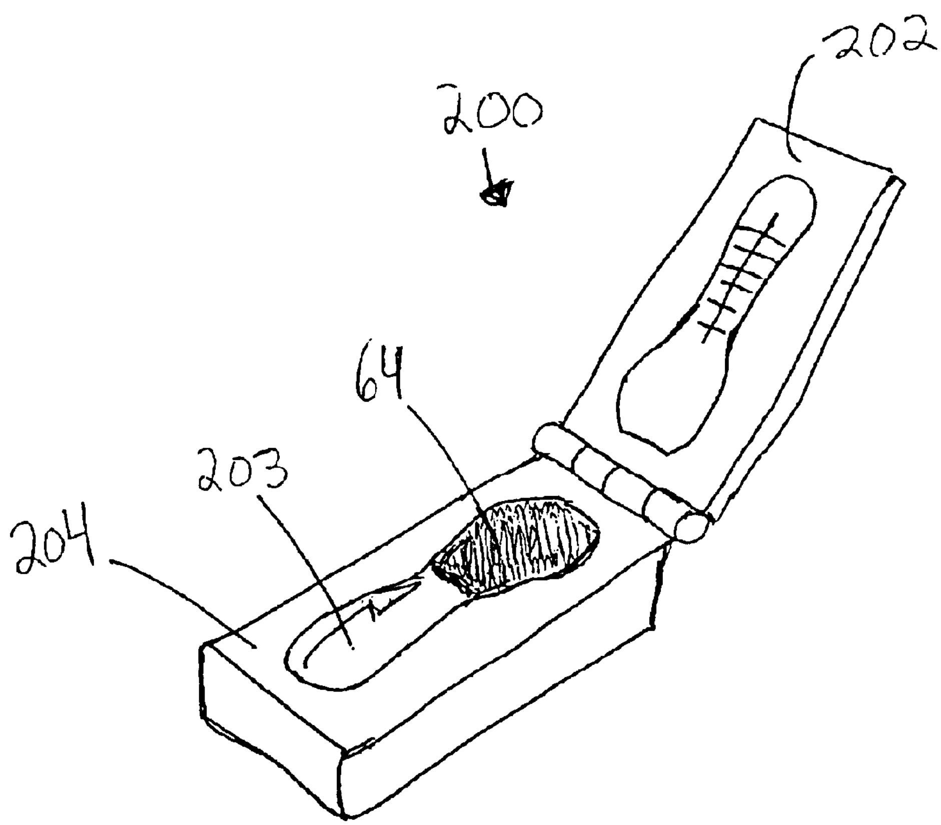
FIG. 12 is a perspective view of a second mold in an open position, the second mold including first and second dies, with the shaped fabric member of FIG. 11 being placed in one of the first and second dies.

In a second molding operation, the shaped fabric member 60 is placed into a second mold 200, shown in FIG. 12. The second mold 200 includes a first die 202 and a second die 204. The first and second dies 202, 204 define a cavity which is generally in the shape of the outsole 40. It will be appreciated that the cavity may not necessarily define the entire heel structure 50 of the outsole 40 but will likely define the remaining portions, e.g., the shank 53 and the ball portion 49. The shaped fabric member 60 (FIG. 11) is inserted into the first mold 202 with the fabric sheet material 62 facing a bottom section 203 of the first die 202. Consequently, the backing layer 64 faces the second die 204 when the second die 204 is closed.

The first and second dies 202, 204 are heated to a predetermined temperature and are closed with respect to one another. Once again, the predetermined temperature is a temperature at which the first and second dies 202, 204 will not damage the fabric sheet material 62 but will permit (1) the thermoplastic rubber forming the backing layer 64 to resoften and (2) permit a second thermoplastic rubber material to soften sufficiently so that it may be injected into the second mold 200. Preferably, the predetermined temperature of the second mold 200 is greater than the predetermined temperature of the first mold 100. In one exemplary embodiment, the predetermined temperature of the second mold 200 is from about 160° C. to about 170° C. It will be appreciated that suitable molding temperatures will vary depending upon a number of parameters, such as the operating conditions and the type of thermoplastic rubber being used.

The second thermoplastic rubber material is injected into the second mold 200 so that if flows within the cavity formed by the first and second dies 202, 204. Because the backing layer 64 is softened, the heated, injected second thermoplastic rubber material may bond with the backing layer 64. In one embodiment, the thermoplastic rubber material used in both the first and second molds 100, 200 is the same material. It will be appreciated that the thermoplastic rubber material used in the first and second molds 100, 200 may be different materials. After heating the materials in the second mold 200 for a sufficient time period, the molds 202, 204 are cooled causing the resultant outsole 40 to cool. After a sufficient cooling period, e.g., several minutes (i.e. 6 or more minutes), the first and second molds 202, 204 are opened and the outsole 40 is removed.

The outsole 40 preferably has the shaped fabric member 60 integrally formed as a part thereof due to the bonding between the backing layer 64 and the surrounding outsole 40. Preferably, the second mold 200 is configured so that the fabric sheet material 62 is not in contact with the second thermoplastic rubber that is injected into the second mold 200. In the shoe 10, the gap 63 separates the fabric sheet material 62 from the surrounding outer surface 42 of the outsole 40. In other words, the outsole 40 is formed around the shaped fabric member 60 so that the ground contacting surface of the outsole 40 is formed of the fabric sheet material 62 and a portion of the outer surface 42 with both components being preferably generally planar with one another and exposed to contact the ground.

After having formed the outsole 40 using the above-described method, the outsole 40 is then incorporated into the shoe 10 by attaching the outsole 40 to the lower 30 to form the shoe 10.

As shown in FIG. 4, the outsole 40 and the corresponding manufacturing process may be modified so that a pattern 230 is formed as part of the shaped fabric member 60. This pattern 230 may be decorative in nature and also provides some functionality as it may be designed to increase the gripping action of the outsole 40. In one embodiment, a bottom of the first die 102 is modified by forming the pattern 230 thereon. For example, small diamond shaped objects may be formed on the first die 102 (FIG. 10) and the fabric sheet material 62 is laid over the first die 102. During the first molding process, the pattern 230 is transferred onto the shaped fabric member 60 as a result of the injection and pressing action of the thermoplastic rubber. The resultant shaped fabric member 60 thus includes a textured surface defined by the pattern 230.

FIGS. 5–7 show another embodiment of the present invention. In this embodiment, a shoe 300 is presented and is generally in the form of a women's shoe having an open aired toe. The shoe 300 includes an upper 310, a lower 320 attached to the upper 310, and an outsole 330 attached to the lower 320.

Because of the open toe nature of shoe 300, the upper 310 is formed of a toe strap 312 and an ankle strap 314. The toe and ankle straps 312, 314 may be formed of any number of suitable materials and in one embodiment, the straps 312, 314 are formed of a backing layer 316 and an exterior cover 318. The backing layer 316 may comprise a fabric backed foam or the like with the exterior cover 318 being attached to the backing layer 316 using known techniques, such as stitching, etc. The exterior cover 318 may be formed of any number of materials, including a high pile fabric. In this embodiment, the ankle strap 314 also includes a buckle assembly 319 for securing the ankle strap 314 around a wearer's ankle. The toe strap 312 is designed to extend across the upper portion of the foot near the wearer's toes to secure the front portion of the foot within the shoe 300. The toe strap 312 should be flexible so as to accommodate foots of different sizes.

The lower 320 includes a fabric-backed foam 322 and a support member 324. The fabric-backed foam 322 provides a cushioned surface for the wearer to place his/her foot. The support member 324 serves to provide a support platform for the wearer's foot and therefore is formed of a rigid material. For example, the support member 324 may be formed of a rigid reinforced cardboard member, a plastic member, a wooden member, etc. so long as the support member 324 retains its shape and provides adequate support to the wearer's foot.

The upper 310 is attached to the lower 320 using conventional techniques, including stitching or securing ends of the straps 312, 314 to the lower 320 and more specifically, by tucking these ends between the support member 324 and the outsole 330. An adhesive or other material may be used to secure the straps 312, 314 to at least one of the support member 324 and the outsole 330.

The outsole 330 in this embodiment includes a shaped fabric member 340 formed as part of the outsole 330 and a heel 360. The outsole 330 also includes an outer surface 332. As best shown in FIGS. 5 and 7, the shaped fabric member 340 is disposed in a ball portion 331 of the outsole 330 and protrudes below the surrounding portions (outer surface 332) of the outsole 330 such that the shaped fabric member 340 is the ground contacting portion of the outsole 330. During normal wear, the wearer contacts the ground surface with the shaped fabric member 340 because it extends below the surrounding sections of the outsole 330.

The heel 360 is attached to the outer surface 332 using conventional techniques, e.g., use of an adhesive, and a bottommost portion 362 of the heel 360 preferably includes a rubber or plastic piece which reduces wear of the heel 360 and provides a gripping surface. A shank portion 363 of the outsole 330 is formed between the heel 360 and the ball portion 331. The shank portion 363 is defined by the outsole 330 and does not include the shaped fabric member 340. The shaped fabric member 340 is thus only provided on sections of the outsole 330 which contact the ground surface during normal wear.

As best shown in FIG. 7, the shaped fabric member 340 is formed of a fabric sheet material 343 and a fabric backing layer 345. As will be described hereinafter, the backing layer 345 is preferably integrally bonded to the material forming the outsole 330 and preferably, the layer 345 and the outsole 330 are formed of the same material so that it will appear to the wearer that the fabric sheet material 343 is simply attached to a particular section of the outsole 330. The backing layer 345 is the material lying immediately underneath the fabric sheet material 343 and serves to define a platform extending downwardly from the surrounding sections of the outsole 330. In this manner, the fabric sheet material 343 is only in contact with the backing layer 345 and not the surrounding sections of the outsole 330.

In this embodiment and in accordance with the present invention, greater than 50% (as measured in terms of area) of the ground contacting sections of the shoe 300 includes the shaped fabric member 340. In the exemplary shoe 300 shown in FIGS. 5–7, the ground contacting surface of the outsole 330 includes the bottommost portion 362 of the heel 360 and the ball portion 331. More specifically, besides the heel portion 362, the only other portion of the outsole 330 which contacts the ground surface is the shaped fabric member 340. Thus in this particular embodiment, the shaped fabric member 340 comprises a substantial portion of the ground contacting surface of the outsole 330 as the outer surface 332 does not contact the ground surface.

Figure 10:
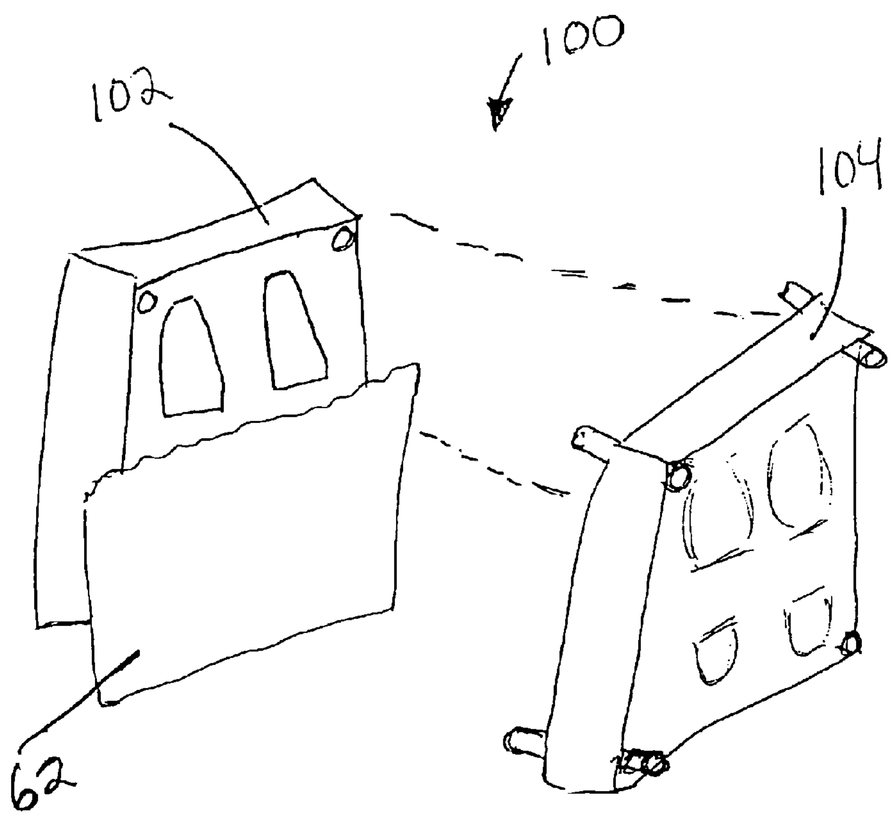
FIG. 10 is an exploded perspective view of a first mold including first and second dies.

The manufacture of the shoe 300 is preferably done in a similar or the same manner as the manufacture of the shoe 10 described in reference to FIGS. 10–12. More specifically, the manufacture is preferably a two stage molding process using the first and second molds 100, 200. In this embodiment, the bonding between the backing layer 345 and the outsole 330 is clearly shown in the cross-sectional view of FIG. 7. After forming the shaped fabric member 340 using the first mold 100, the member 340 is then placed in the second mold 200 to form the outsole 330 illustrated in FIGS. 5–7. During the second molding process, the fabric sheet material 342 is not in contact with the second thermoplastic rubber that is added to the second mold 200 to form the remaining sections of the outsole 330 but rather the second thermoplastic rubber is disposed over and around the heated fabric backing layer 344 (preferably a thermoplastic rubber also).

Now referring to FIGS. 8–9 which illustrate yet another embodiment of the present invention. In this embodiment, a shoe 400 is presented and generally includes an upper 410, a lower 420, and an outsole 430. The shoe 400 is in the form of a walking or leisure type shoe instead of the more formal shoes shown in FIGS. 1–7. The upper 410 and lower 420 have conventional constructions and are attached to one another using conventional techniques. The outsole 430 is also attached to the lower 420 using conventional techniques.

According to the present invention, the outsole 430 includes a shaped fabric member 440 and a surrounding outsole surface 450. The shaped fabric member 440 has a fabric sheet material 442 disposed on an outer surface thereof so that the fabric sheet material 442 contacts the ground surface or the like during normal wear of the shoe 400. Bottom portions (surface 450) of the outsole 430 surrounding the shaped fabric member 440 are formed of any number of suitable materials including but not limited to plastic and rubber materials. The bottom portions of the outsole 430 are preferably generally planar with respect to the shaped fabric member 440 to define a substantially planar ground contacting surface of the outsole 430. In this embodiment, the shoe 400 includes two shaped fabric members 440, one disposed proximate a heel portion 402 of the shoe 400 and the other disposed proximate to a toe portion 404 of the shoe 400. A gap 444 is formed between the fabric sheet material 442 and the outer surface 432 of the outsole 430 in one exemplary embodiment.

According to the present invention, the shaped fabric members 440 occupy an area which is at least greater than 50% of the area of the outsole 430 which contacts the ground surface. Preferably, the shaped fabric members 440occupy greater than 50% to about 90% of the entire ground contacting surface of the outsole 430. The shaped fabric members 440 may have any number of shapes and sizes so long as the shaped fabric members 440 occupy greater than 50% of the surface of the outsole 430 which contacts the ground surface during normal wear.

The shoe 400 is preferably formed using the manufacturing process described herein with reference to FIGS. 10–12. In other words, the shaped fabric members 440 are formed using a first molding process and then are inserted into the second mold 200 (FIG. 12) where a second molding process is conducted. During the second molding process, the outsole 330 is formed having the shaped fabric members 440 as integral parts thereof. The result is that the outsole 430 of the shoe 400 is partially covered with fabric sheet material 442, while surrounding portions of the outsole 430 do not contain the fabric sheet material 442 and are formed of suitable materials. It will be appreciated that while thermoplastic rubbers are preferred for use in the molding process, other types of materials may be used so long as they produce the shaped fabric member having the characteristics described herein with reference to the various embodiments of the present invention.

The present invention thus provides an outsole and a manufacturing process thereof which present an outsole having a ground contacting surface, wherein the ground contacting surface has a portion thereof which is defined by a fabric sheet material. Advantageously, the outsole of the present invention is slip-resistant, durable, and offers a competitive advantage to the manufacturer.

While the invention has been particularly shown and described with reference to preferred embodiments thereof, it will be understood by those skilled in the art that various changes in form and details may be made therein without departing from the spirit and scope of the invention.

What is claimed is:

1. A shoe comprising:

an upper; and an outsole attached to the upper, the outsole having a first section formed of a first material and including a ground contacting portion and a non-ground contacting portion, the outsole having a second section including an outer ground contacting layer formed of a fabric material, wherein the second section further includes a backing layer formed of a thermoplastic material, the fabric material of the outer ground contacting layer being connected to the backing layer to define an integral assembly and wherein the backing layer is integrally molded with a base section of the non-ground contacting portion of the first section to define a fused bond at a boundary zone between the backing layer and the base section such that the fabric material is a ground contacting surface, and wherein the ground contacting portion of the first section is free of fabric material.

2. The shoe of claim 1, wherein the fabric is free of contact with the first section.

3. The shoe of claim 1, wherein the backing layer is connected to the first material of the first section to define an integral outsole member.

4. The shoe of claim 3, wherein the backing layer and the first material are made of the same material.

5. The shoe of claim 1, wherein there is a gap between the fabric and the first material.

6. The shoe of claim 1, wherein the fabric material is a non-woven fabric material.

7. The shoe of claim 1, wherein the first material is selected from the group consisting of rubber materials and plastic materials.

8. The shoe of claim 1, wherein the first material is a shape-retaining moldable thermoplastic material.

9. The shoe of claims 1, wherein a bottommost section of the fabric material and a bottommost section of first section are planar with respect to one another.

10. The shoe of claim 1, wherein the fabric material bulges outwardly from surrounding portions of the first section of the outsole so that the fabric material extends beyond a plane containing the ground contacting surface of said surrounding portions.

11. The shoe of claim 1, wherein the second section occupies a portion of the ground contacting surface which is greater than the first section.

12. The shoe of claim 1, wherein the fabric material has a prescribed pattern that is formed as a part thereof.

13. The shoe of claim 1, wherein the backing layer includes a prescribed pattern formed as a part thereof which is visible through the fabric material when the fabric material is integrally attached thereto.

14. A shoe outsole comprising:

a) a first section including a ground contacting portion and a non-ground contacting portion; and a second section including an outer ground contacting layer formed of a fabric material, wherein the second section includes a backing layer formed of a thermoplastic material and being connected to the fabric material to define an integral insert, wherein the non-ground contacting portion of the first section includes at least one recessed section for receiving the insert, the backing layer being integrally molded with a base of the at least one recessed section to define a fused bond at a boundary zone between the backing layer an the base so that the fabric material and the ground contacting portion of the first section together comprise a ground contacting surface, and wherein the ground contacting portion of the first section is free of fabric material.

15. The outsole of claim 14, wherein the backing layer and the first section comprise a material selected from the group consisting of rubber materials and plastic materials.

16. The outsole of claim 14, wherein the second section occupies a portion of the ground contact surface which is greater than the first section.

17. The outsole of claim 14, wherein the non-ground contacting portion is moldably attached to the backing layer.

18. The outsole of claim 14, wherein the non-ground contacting portion of the first section completely surrounds the fabric material.

19. The outsole of claim 14, wherein there is a gap between a perimeter edge of the fabric material and the non-ground contacting portion of the first section.

20. The outsole of claim 14, wherein the fabric material occupies more than fifty percent of the ground contacting surface of the outsole.

21. The outsole of claim 14, wherein the fabric material has a prescribed pattern that is formed as a part thereof.

22. The outsole of claim 14, wherein the backing layer includes a prescribed pattern formed as a part thereof which is visible through the fabric material when the fabric material is integrally attached thereto.

23. A shoe comprising:

a) an upper; and b) an outsole formed of a first material and having a first face attached to the upper and a second face defining a ground contacting surface, the second face having at least one recessed section for receiving at least one insert, the at least one insert being formed of a thermoplastic backing layer and an outer ground contacting layer that is formed of a fabric material which is integrally attached to the backing layer, wherein the backing layer and the first material are integrally, moldably attached in a softened state to form a unitary outsole construction with the fabric material defining a ground contacting surface.

24. The shoe of claim 23, wherein the first material comprises a thermoplastic material.

25. The shoe of claim 23, wherein the backing layer is attached to the first material along at least a base floor of the at least one recessed section by a fused bond.

26. The shoe of claim 23, wherein the fabric material occupies more than fifty percent of the entire ground contacting surface of the outsole.

* * * * *